United States Patent [19]

Falk

[11] Patent Number: 4,913,752

[45] Date of Patent: Apr. 3, 1990

[54] NICKEL-BASED SOLDER FOR HIGH-TEMPERATURE SOLDERED JOINTS

[75] Inventor: Joachim Falk, Bruchkoebel, Fed. Rep. of Germany

[73] Assignee: Vacuumschmelze GmbH, Fed. Rep. of Germany

[21] Appl. No.: 247,661

[22] Filed: Sep. 22, 1988

[30] Foreign Application Priority Data

Sep. 29, 1987 [DE] Fed. Rep. of Germany ....... 3732749
Sep. 30, 1987 [DE] Fed. Rep. of Germany ....... 3732998

[51] Int. Cl.$^4$ .............................................. C22C 38/08
[52] U.S. Cl. .................................... 148/336; 148/423; 148/424; 148/426; 148/427; 148/442
[58] Field of Search ............... 148/426, 427, 424, 423, 148/442, 336

[56] References Cited

U.S. PATENT DOCUMENTS 4,405,391  9/1983  DeCristofaro ..................... 148/403

FOREIGN PATENT DOCUMENTS 2755435  6/1978  Fed. Rep. of Germany .

*Primary Examiner*—R. Dean
*Attorney, Agent, or Firm*—Hill, Van Santen, Steadman & Simpson

[57] ABSTRACT

A nickel-based solder for high-temperatured soldered joints contains up to 15 percent by weight silicon with necessary additives of titanium, zirconium, niobium, arsenic, phosphorus, copper, zinc, indium, germanium, scandium or carbon, and is manufactured in the form or a band or ribbon by rapid quenching from a melt. The resulting rapidly quenched solder ribbon is ductile, and has a crystalline structure.

16 Claims, No Drawings

NICKEL-BASED SOLDER FOR HIGH-TEMPERATURE SOLDERED JOINTS

BACKGROUND OF THE INVENTION

1. Field of the Invention

The present invention is directed to a nickel-based solder for high-temperature soldered joints of steels and nickel-based alloys.

2. Description of the Prior Art

Nickel based solders are primarily employed for high-temperature soldered joints of different types of steels and nickel-based alloys. Because of the unavoidable embrittling intermetallic compounds, nickel solders which are currently known are only manufactured in powder form, or as a solder paste produced from the powder, or as amorphous ribbons.

German Patent 27 55 435 discloses a uniform, ductile solder foil for hard-soldering of metal parts which is manufactured using a known rapid-quenching technique. The solder consists of 0 through 4 atomic percent iron, 0 through 21 atomic percent chromium, 0 through 16 atomic percent boron, 0 through 19 atomic percent silicon, 0 through 22 atomic percent phosphorus, and the remainder nickel, with possible contaminants. The total content of iron, chromium and nickel should lie in the range from 76 through 84 atomic percent, and the total content of boron, silicon and phosphorus should lie in the range from 16 through 24 atomic percent. The foil is essentially vitreous, i.e., amorphous.

Another ductile hard solder foil is described in European Published Application 0 056 141 having at least 50 percent vitreous structure, and consisting of palladium, boron and nickel. This solder consists of 1 through 41 atomic percent palladium, 0 through 20 atomic percent chromium, 11 through 20 atomic percent boron, and the remainder nickel. The total content of nickel, palladium and chromium is in the range of 80 through 89 atomic percent.

These and similar alloy compositions are essentially suitable for hard soldering at high temperatures of austenitic, martensitic and ferritic stainless steels, as well as nickel-based alloys. Soldering at high temperatures, i.e., above 1000° C., is required for component parts which are exposed to such high temperatures during use. Examples are components of aircraft turbines, and metallic exhaust catalyzers.

When soldering thin materials, the material around the soldering joint is significantly changed due to the diffusion of the solder into the material. As a result, properties of the material are usually drastically degraded. Included among these properties, in addition to the mechanical properties, are embrittlement and the corrosion properties such as, for example, a deterioration of the oxidation properties. This problem is especially complicated in high-temperature materials as are employed, for example, in exhaust catalyzers for motor vehicles.

Fe-Cr-Al alloys have proven particularly well-suited as a carrier material for such exhaust catalyzers because of their high resistance to oxidation. In order to maintain the flow-through resistance in the catalyzer at a low level, thin bans approximately 50 μm in thickness are used, from which the carrier member is wound, forming a honeycomb member. For stability, soldering of the individual winding layers to each other is required. This has proven extremely difficult, and such soldered joints have proved unsatisfactory, for the following reasons. Soldering using powder solder requires a considerable technological outlay, because wetting and contamination by the solder at locations which are not to be soldered is unavoidable. The use of a precise dose of the solder in powder form is not possible, and as a result a significant change in the alloy composition of the carrier material, which is only about 50 μm thick, can occur at the soldered location. Solder pastes are manufactured from powder solders with an organic binder, which may constitute up to 50 percent of the solder paste. The use of such pastes is thus limited by this binder, since it must burn during soldering. The wetting capability of the solder is thereby degraded, and a contamination of the soldered location with carbon cannot be avoided. Soldering with amorphous solder bands is unsatisfactory because the extremely high yielding point of the amorphous solder ribbon can considerably complicate further processing. The use of an amorphous solder ribbon presents considerable difficulties whenever a cutting or breaking of the component is required in further processing. A high boron or phosphorus content, as is necessary for vitrification in amorphous alloys, is undesirable in a solder alloy. This is in part because the relatively large percentage of those elements in the alloy necessarily requires that other elements be present in lower percentages, which thereby deteriorates the mechanical properties and the oxidation properties of the alloy to a considerable degree. Lastly, due to the high nickel content in the solder, austenite forms in the carrier material and in the environment of the soldered joint. This austenite deteriorates the oxidation properties of the soldered joint, so that a premature oxidation through the joint can be seen.

Previous attempts have been made to solve these problems by using optimally small quantities of solder. Due to the diffusion during soldering, however, the nickel in the solder is distributed substantially equally over the solder material and the carrier material in the region of the soldered joint. In the aforementioned soldering of the catalyzer carrier, wherein the carrier band has a thickness of only 50 μm, only a small amount of material is available for such diffusion processes. In order to obtain a sufficient nickel concentration in the catalyzer carrier, so that no conversion to form austenite occurs, it is usually sufficient merely to maintain the quantity of solder low. This could be achieved by using especially thin amorphous solder foils.

It has therefore been attempted to use an amorphous solder foil having a band thickness of only 15 μm. This attempted solution, however, has serious disadvantages. The vitrifying elements such as boron which are present in such amorphous alloys drastically deteriorate the oxidation properties. As noted above, the high yielding point of the amorphous solder ribbons is also unfavorable. Even when such a thin foil as described above is used, problems still arise if a cutting or breaking of the solder foil is required.

SUMMARY OF THE INVENTION

It is an object of the present invention to provide nickel-based solders which solve the above problems and which are relatively simple to manufacture.

The above object is achieved in the most general sense in a nickel-based solder wherein 5 through 60 percent by weight of the nickel is replaced by iron, with a ductile solder ribbon having a crystalline structure being manufactured from this alloy by rapid quenching.

Various further compositions and examples of nickel-based solder in accordance with the principles of the present invention are discussed in detail below.

DESCRIPTION OF THE PREFERRED EMBODIMENTS

As noted above, nickel-based solders have heretofore been manufactured as powders or as solder paste having an organic binder because of the relatively high proportion of metalloid elements therein, and the embrittlement properties associated therewith. It has been surprisingly found, however, that crystalline and ductile solder ribbons can be manufactured with such alloy compositions in a simple manner by using the rapid quenching technique. The embrittling intermetallic phases which would otherwise occur are largely suppressed by the rapid cooling in the manufacture of such ribbons. Crystalline and ductile solder ribbons can thus be successfully manufactured even with low thicknesses. The advantages of such solder ribbons in accordance with the principles of the present invention are a simplification of the soldering process. In the aforementioned example of a catalyzer carrier, it is possible to co-wind the solder ribbon into the honeycomb member. By heating the entire honeycomb member, soldering then occurs, which will be locally limited only to the intended regions.

Various examples of alloys for solder ribbons in accordance with the principles of the present invention are set forth below.

A nickel-silicon-based alloy in accordance with the principles of the present invention has a silicon content of 2 through 15 percent by weight, or more specifically 6 through 12 percent silicon by weight. For improving the wetting of the solder, as well as for precisely setting the melting temperature, small amounts of additives selected from the group consisting of Ti, Zr, Nb, As, P, Cu, Mn, Zn, In, Ge, Sc and C may be used, the additives constituting a total content of 0.1 through 10 percent by weight. The ranges may be further specified as 9 through 11.5 percent by weight silicon, 0.5 through 2 percent by weight titanium, and the remainder nickel. An example of such a solder has silicon in an amount of 11 percent by weight, titanium in an amount of 1 percent by weight, and the remainder nickel.

Another solder in accordance with the principles of the present invention is a nickel-chromium-based alloy having a chromium content of 2 through 40 percent by weight. The ranges may be further specified as 6 through 8.3 percent silicon, 12 through 20 percent by weight chromium, and the remainder nickel. An example of such a solder has silicon in an amount of 8.3 percent by weight, chromium in an amount of 13 percent by weight, and the remainder nickel.

Another solder in accordance with the principles of the present invention has 2 through 8.3 percent by weight silicon, 4 through 50 percent by weight chromium, and the remainder nickel.

A further solder in accordance with the principles of the present invention is a nickel-manganese-based alloy having a manganese content of 2 through 80 percent by weight. To improve the wetting characteristics as well as for precisely setting the melting temperature, small amounts of additives selected from the group consisting of Ti, Zr, Nb, As, P, Cu, Zn, In, Ge, Sc and C may be used, the additives having a total content of 0 through 10 percent by weight. The ranges may be further specified as 7 through 9 percent by weight silicon, 5 through 15 percent by weight manganese, 4 through 6 percent by weight copper, and the remainder nickel. An example of such a solder has manganese in an amount of 10 percent by weight, silicon in an amount of 8 percent by weight, copper in an amount of 5 percent by weight, and the remainder nickel.

The replacement of nickel by iron in the above solders in accordance with the principles of the present invention is particularly beneficial because conversion of austenite in the original ferritic carrier material can be considerably diminished. As noted above, one of the causes for deterioration of the oxidation properties is the high nickel content in the solder, which is reduced by the iron additive.

Depending upon the ribbon thickness of the carrier and of the solder ribbon, it has been shown that the total nickel content can be reduced further by a factor of 3 through 6 due to diffusion processes after the soldering. Given an iron content of between 5 and 60 percent by weight, the nickel content at the soldered joint can be reduced to below 15 percent, in a nickel-based solder. As a consequence of the high solubility of the iron in the nickel, the addition of iron causes only a slight modification of the melting point, and does not degrade the other solder properties.

It is especially beneficial if the nickel-based solder, regardless of the amount of replacement of nickel by iron, contains up to 15 percent by weight silicon.

A typical applied example is a nickel-based solder having 8 through 11 percent by weight silicon. Such a solder has oxidation properties which are drastically approved if 30 through 40 percent by weight of the nickel is replaced by iron. Improved wetting characteristics as well as a noticeable increase in the useful life of the soldered joint can be achieved in an alloy having 30 through 40 percent by weight iron, 8 through 11 percent by weight silicon, and the remainder nickel.

For testing purposes, specimen ribbons 5mm wide were manufactured with various thicknesses between 60 and 10 $\mu$m. The ductility, solderability, wetting and oxidation properties were tested by soldering Fe-Cr-Al sheet metal having a thickness of 50 $\mu$m with such solder ribbons.

Although modifications and changes may be suggested by those skilled in the art it is the intention of the inventor to embody within the patent warranted hereon all changes and modifications as reasonably and properly come within the scope of his contribution to the art.

I claim as my invention:

1. A rapidly quenched, ductile, crystalline solder ribbon for high-temperature soldering of steels and nickel-based alloy consisting essentially of 2 through 15 percent by weight silicon, 0.1 through 10 percent by weight of at least one of the elements selected from the group consisting of titanium, zirconium, niobium, arsenic, phosphorus, copper, zinc, indium, germanium, scandium and carbon, and the remainder nickel.

2. A solder ribbon as claimed in claim 1 having 6 through 12 percent by weight silicon.

3. A solder ribbon as claimed in claim 1 having 9 through 11.5 percent by weight silicon, 0.5 through 2 percent by weight titanium, and the remainder nickel.

4. A solder ribbon as claimed in claim 1 further having 2 through 80 percent by weight manganese.

5. A solder ribbon as claimed in claim 4 having 7 through 9 percent by weight silicon, 5 through 15 percent by weight manganese, 4 through 6 percent by weight copper, and the remainder nickel.

6. A solder ribbon as claimed in claim 1 having 2 through 40 percent by weight chromium.

7. A solder ribbon as claimed in claim 1 having a thickness between 10 μm and 60 μm.

8. A rapidly quenched, ductile crystalline solder ribbon for high-temperature soldering of steels and nickel-based alloys, said solder ribbon consisting essentially of 2 through 8.3 percent by weight silicon, 4 through 50 percent chromium, and the remainder nickel.

9. A solder ribbon as claimed in claim 8, having 6 through 8.3 percent by weight silicon, 12 through 20 percent by weight chromium, and the remainder nickel.

10. A solder ribbon as claimed in claim 8 having a thickness of 10 μm through 60 μm.

11. A rapidly quenched ductile crystalline solder ribbon for high-temperature soldering of steels and nickel-based alloys, said solder ribbon consisting essentially of 5 through 60 percent by weight iron and the remainder nickel.

12. A solder ribbon as claimed in claim 11 having up to 15 percent by weight silicon.

13. A solder ribbon as claimed in claim 12 having 6 through 12 percent by weight silicon.

14. A solder ribbon as claimed in claim 13 having 30 through 40 percent by weight iron, 8 through 11 percent by weight silicon, and the remainder nickel.

15. A solder ribbon as claimed in claim 11 having at least one element selected from the group consisting of titanium, zirconium, niobium, arsenic, phosphorus, chromium, manganese, copper, zinc, indium, germanium, scandium and carbon in a total content of 0.1 through 10 percent by weight.

16. A solder ribbon as claimed in claim 11 having a thickness of 10 μm through 60 μm.

* * * * *